Figure 2:
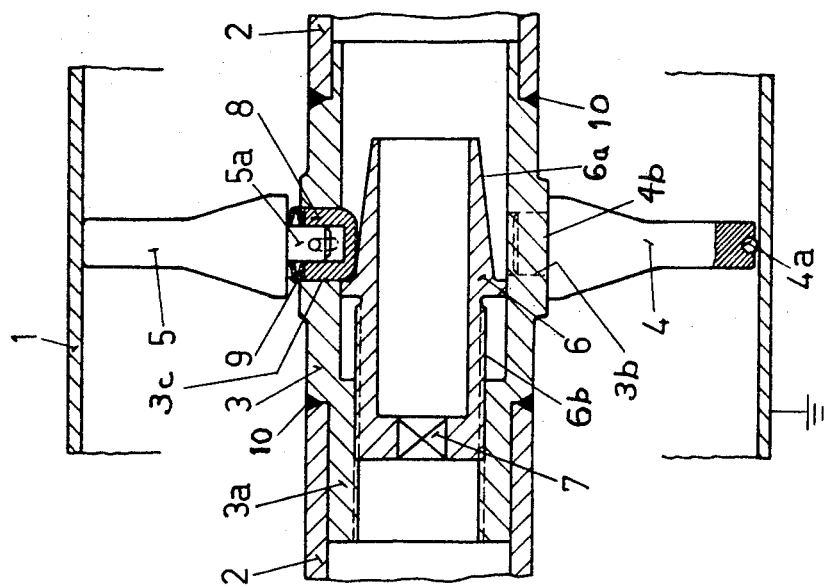

United States Patent

Floessel

[11] 3,739,074
[45] June 12, 1973

[54] INSULATION GAS-FILLED TUBULAR CASING STRUCTURE FOR HIGH-VOLTAGE CONDUCTOR

[75] Inventor: Dieter Floessel, Fislisbach, Switzerland

[73] Assignee: Aktiengesellschaft Brown, Boveri & Cie, Baden, Switzerland

[22] Filed: June 13, 1972

[21] Appl. No.: 262,174

[30] Foreign Application Priority Data
Sept. 16, 1971 Switzerland .................. 13539/71

[52] U.S. Cl. .............. 174/28, 174/16 B, 174/99 B
[51] Int. Cl. ............................................. H01b 9/06
[58] Field of Search... 174/15 C, 174/13, 16 B, 27, 174/28, 29, 25, 88 B, 99 B, 111; 138/113, 114, 121, 122

[56] References Cited
UNITED STATES PATENTS

| | | | |
|---|---|---|---|
| 3,688,015 | 8/1972 | Graybill | 174/16 B |
| 3,221,097 | 11/1965 | Cognet et al. | 174/99 B |
| 2,355,111 | 8/1944 | Rouault | 174/28 |
| 2,191,071 | 2/1940 | Duttera | 174/28 |
| 1,978,649 | 10/1934 | Roberts | 174/27 UX |
| 1,935,313 | 11/1933 | Feldman | 174/28 |

FOREIGN PATENTS OR APPLICATIONS

| | | | |
|---|---|---|---|
| 879,601 | 3/1943 | France | 174/28 |

Primary Examiner—Bernard A. Gilheany
Assistant Examiner—A. T. Grimley
Attorney—Pierce, Scheffler and Parker

[57] ABSTRACT

A high-voltage tubular electrical conductor is encapsulated within an insulation gas filled rectilinear tubular casing and supported centrally within the casing by longitudinally spaced support-insulators each of which is provided with three legs spaced 120° apart about the conductor. Two of the legs are fixedly secured to the conductor structure and include rolling means in the form of balls at their outer ends to facilitate abrasion-free insertion of the conductor-support insulator assembly within the casing. The third leg is supported by the tubular conductor for movement in a radial direction by a drive mechanism to enable the leg to be moved from radially inward position establishing an initial clearance with the wall of the casing during insertion of the conductor and support insulator assembly to a radially outward position establishing a spring-loaded elastic pressure contact with the casing wall thereby to secure the support-insulator in position against longitudinal displacement. The drive mechanism for the radially displaceable leg is a tapered screw which, when rotated by a key inserted through the conductor, advances the tapered drive sur-face longitudinally and forces the leg radially outward.

6 Claims, 3 Drawing Figures

3,739,074

INSULATION GAS-FILLED TUBULAR CASING STRUCTURE FOR HIGH-VOLTAGE CONDUCTOR

The present invention relates to an improvement in the construction of insulation gas-filled tubular encased i.e. encapsulated high-voltage electrical conductors. More particularly, the invention concerns an enclosed high-voltage conductor of the general type wherein the conductor is held in place centrally within a rectilinear, grounded metallic casing by means of support insulators which are spaced longitudinally along the conductor.

Enclosed high-voltage conductor structures of this type are known to the industry, reference being made, for example, to the disclosure in U.S. Pat. No. 2,428,051 wherein the conductor is supported by three legs uniformly spaced about the conductor, i.e. 120° apart in the same plane, and which extend radially into engagement with the inner wall surface of the cylindrical enclosing casing structure. The inner ends of the legs are screwed to the conductor and the outer ends are provided with spring means which enable the legs to be maintained in place by spring-loaded frictional contact with the inner wall surface of the casing. This construction, however, suffers from the disadvantage that when the insulator-conductor structure is inserted within the casing, a certain amount of abrading unavoidably takes place as the spring components slide under radial pressure along the inner wall surface of the casing with the result that small bits and chips of metal collect within the casing. However, without an exceedingly high cost, it is impossible to remove all of such impurities from the interior of the casing, with the result that the electrical stability of the high-voltage line is adversely affected.

The principal objective of the present invention is to provide an improved multi-leg support insulator construction for encased high-voltage conductors which avoids the disadvantages of the prior known constructions and which enables the multi-leg support to be inserted into the enclosing casing without any abrading effect. The objective is attained in that an initial clearance is provided between the multi-leg support and the inner wall of the casing to permit abrasion-free insertion of the support to its appointed location within the casing, following which at least one leg of the multi-leg support is expanded radially to engage the inner wall of the casing and develop a pressurized, holding contact between the support and casing. More particularly, the pressurized holding contact between the multi-leg support and casing is established by a tapered-screw drive located within the conductor, which latter has a tubular configuration, the tapered drive being advanced longitudinally within the conductor as it is rotated by a suitable tool and causing the inner end of one leg of the support, which is mounted for radial movement in the wall of the conductor, and which is engaged by the tapered surface of the drive, to be displaced in the radial direction to engage the inner wall of the casing. As a further feature of the invention, the tapered-screw drive is mounted within an internally threaded nipple interconnecting the ends of two conductor sections joined together by the nipple.

Figure 1:
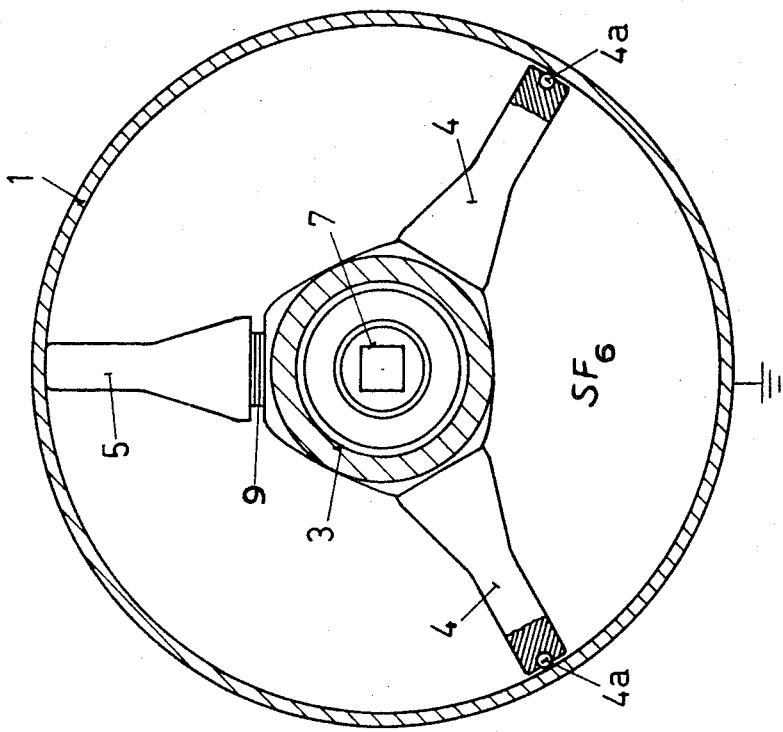
Figure 3:
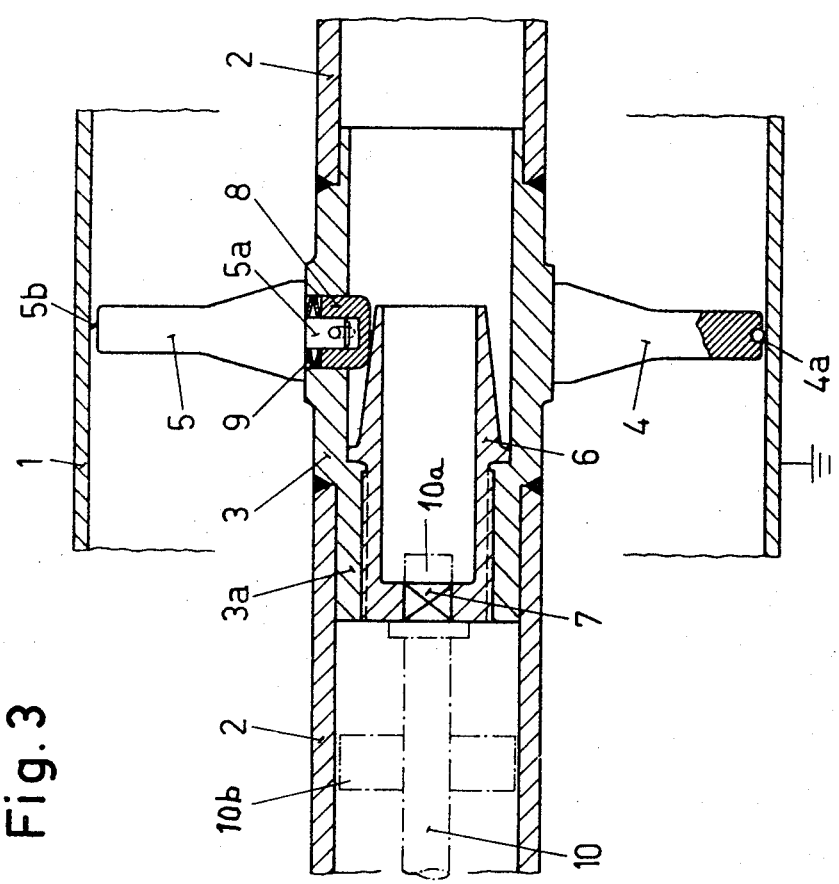

The foregoing as well as other objects and advantages inherent in the improved encapsulated conductor structure will become more apparent from the following description of a preferred embodiment thereof and from the accompanying drawings wherein:

FIG. 1 is a transverse section through the encapsulated conductor in the vicinity of the insulator support structure; and FIGS. 2 and 3 are views in diametral section of the encapsulated conductor showing the details of the tapered-screw drive and legs of the support insulator, FIG. 2 depicting the radially driven leg in its holding position against the inner wall of the casing, and FIG. 3 depicting the radially driven leg in the initial loosened position, clearing the wall of the casing.

With reference now to the drawings, wherein corresponding reference numerals are used for corresponding structural components in all figures, the encapsulated conductor structure includes a rectilinear cylindrical tubular casing 1 which preferably is made from aluminum and earthed as indicated by the conventional symbol. Located centrally within the casing 1 is the high-voltage conductor structure consisting of cylindrical tubular conductor sections 2, 2 which are joined together by a tubular coupling nipple 3. The opposite ends of the nipple are provided with portions of reduced diameter which are inserted within the ends of the conductor sections 2, 2 and welded thereto by circular welds 10.

The multi-leg insulator support structure for the conductor consists of three legs 4, 4 and 5 spaced 120° apart around the conductor and which are located in the same plane. As depicted in FIG. 2, each of the two legs 4, 4 is provided at its inner end with a foot portion 4b of reduced cross-section which is inserted in an opening 3b in nipple 3 having a complementary configuration and secured thereto by any suitable means such as an adhesive. The outer end of each leg 4, 4 is provided with an anti-friction rolling means such as balls 4a made from metal or plastic. During installation of the conductor-support insulator assembly within casing 1, these roll means 4a at the outer ends of the two legs 4, 4 ensure easy and abrasion-free relative longitudinal movement between the casing and the conductor-support insulator assembly, there being at such time a clearance 5a between the third leg 5 and the casing wall, as depicted in FIG. 3.

As previously indicated, this third leg 5 is mounted for movement in a radial direction and is actuated by a tapered-screw drive. To this end, a cup-shaped part 8 is mounted for sliding movement within an opening 3c in nipple 3, and inserted into the outer open end of the cup 8 is the inner end 5a of the leg 5 and which has a reduced cross section. Cup springs 9 surround the inner end 5a of leg 5 and provide an elastically yieldable drive between cup 8 and leg 5. The inner end of cup 8 engages the inner tapered end 6a of a drive member 6 which is externally threaded at 6b at its opposite end to establish a screw engagement with an internally threaded part 3a of the conductor nipple 3. In order to effect rotation of drive member 6, the end wall at the threaded end 6b thereof is provided with a non-circular, e.g. rectangular opening 7 to receive the complementarily configured end 10a of a key 10 inserted into the hollow conductor 2 and which is guided longitudinally within conductor 2 by a cylindrical collar 10b thereon slightly smaller in diameter than the internal diameter of the conductor.

As previously explained, the assembly of conductor structure 2, 3, 2 and its related tri-leg insulator support 4, 4, 5 are located with the encapsulating casing 1 by a sliding movement therebetween, in which the balls 4a on the two legs 4, 4 rollingly glide along the inner wall of the casing to the proper position, the third leg 5 being in its radially inward position as depicted in FIG. 3 to develop a clearance 5b between the outer end thereof and the casing wall. Upon reaching the proper position within casing 1, key 10, with its end 10a inserted into the opening 7 in drive member 6 is then rotated thus effecting a longitudinal advance of drive member 6 to the right, as viewed in FIG. 2, accompanied by radially outward displacement of cup 8 and leg 5 as cup 8 moves upwardly along the taper 6a. Cup 8 imparts movement to leg 5 indirectly by way of the cup springs 9 which serve two functions. One function is to prevent excessive radial pressure by the legs 4, 4, 5 upon casing 1 which otherwise could lead to deformations of the casing at the three points of contact with the legs; secondly, and most important, these springs provide compensation for an expansion or contraction of the casing and support insulator which may arise, for example, as a result of a change in temperature.

In accordance with standard procedure, the interior of casing 1 is filled with an insulating gas such as, for example, $SF_6$ pressurized to a pressure of about 4 atmospheres. Finally, it will be understood that the conductor structure is supported within its casing by a number of the insulator supports constructed in accordance with the invention, and spaced along the conductor at the desired intervals. However, in order to simplify the drawings, only one of the conductor supports and the related portion of the casing have been included.

I claim:

1. An encapsulated gas-filled high-voltage electrical conductor structure comprising a rectilinear tubular metallic gas-filled casing, a rectilinear electrical conductor extending longitudinally within said casing, and at least one support insulator structure for centering said conductor within said casing and securing it against longitudinal displacement therein, said support insulator structure comprising at least three legs mounted on said conductor and extending radially in different directions therefrom in a common plane, the outer ends of a plurality of said legs secured to said conductor in fixed position being provided with rolling means to facilitate abrasion-free insertion of the conductor-support insulator assembly within said casing in rolling contact with the inner wall thereof, and at least another one of said legs being movable in the radial direction and including drive means therefor providing leg movement from a radially inward position establishing an initial clearance between its outer end and the inner wall of said casing to a radially outward position following insertion of said conductor-support insulator assembly and establishing a pressurized contact with the inner wall of said casing thereby to secure said conductor-support insulator assembly against longitudinal displacement within said casing.

2. An encapsulated insulation gas-filled high-voltage electrical conductor structure comprising a rectilinear tubular metallic gas-filled casing, a rectilinear tubular electrical conductor extending longitudinally within said casing, and at least one support insulator structure for centering said conductor within said casing and securing it against longitudinal displacement therein, said support insulator structure comprising three legs mounted on said conductor and extending radially in different directions therefrom in a common plane, the outer ends of two of said legs secured to said conductor in fixed position being provided with rolling means to facilitate abrasion-free insertion of the conductor-support insulator assembly within said casing in rolling contact with the inner wall thereof, and the third leg being mounted on said conductor for movement in a radial direction and including a tapered screw drive located within said conductor providing movement of said third leg from a radially inward position establishing an initial clearance between its outer end and the inner wall of said casing to a radially outward position following insertion of said conductor-support insulator assembly and establishing a pressurized contact with the inner wall of said casing thereby to secure said conductor-support insulator assembly against longitudinal displacement within said casing.

3. An encapsulated insulation gas-filled high-voltage electrical conductor structure as defined in claim 2 wherein the inner end portion of said radially movable third leg is reduced in cross-section and is received in a cup member which extends through an opening in the wall of said conductor to engage the tapered surface of said tapered screw drive, and spring means are provided in the connection between said cup member and said third leg through which the radially outward force is applied to said third leg thereby providing a yieldable connection therebetween to accommodate temperature-induced expansion or contraction of said casing.

4. An encapsulated insulation gas-filled high-voltage electrical conductor structure as defined in claim 3 wherein said spring means are constituted by cup springs which surround said end portion of reduced cross-section.

5. An encapsulated insulation gas-filled high-voltage electrical conductor structure as defined in claim 3 wherein the tapered screw component of said drive includes a non-circular opening for receiving the complementarily configured end of a tool inserted through said tubular conductor for effecting rotation of said tapered screw and the simultaneous longitudinal advance thereof.

6. An encapsulated insulation gas-filled high-voltage electrical conductor structure as defined in claim 3 wherein the three legs of said support insulator structure are mounted on a tubular conductive nipple interconnecting the ends of adjacent tubular conductor sections, said nipple being internally threaded to engage external threads provided on said tapered screw, said tapered screw component being provided with a non-circular opening for receiving the complementarily configured end of a tool inserted through said tubular conductor section and nipple for effecting rotation of said tapered screw and the simultaneous longitudinal advance thereof, and said tubular nipple being provided with an opening in the wall thereof and through which said cup member extends to engage the tapered surface of said screw.

* * * * *